(12) United States Patent
Macaluso

(10) Patent No.: US 7,783,729 B1
(45) Date of Patent: Aug. 24, 2010

(54) TRANSMITTING MOBILE DEVICE DATA

(75) Inventor: Anthony G. Macaluso, Rancho Santa Fe, CA (US)

(73) Assignee: Single Touch Interactive, Inc., Carson City, NV (US)

( * ) Notice: Subject to any disclaimer, the term of this patent is extended or adjusted under 35 U.S.C. 154(b) by 1370 days.

(21) Appl. No.: 11/086,894

(22) Filed: Mar. 21, 2005

Related U.S. Application Data

(60) Provisional application No. 60/554,864, filed on Mar. 19, 2004.

(51) Int. Cl.
*G06F 15/177* (2006.01)

(52) U.S. Cl. ............... 709/220; 709/221; 717/168; 717/169; 717/170; 455/414.2; 455/414.3; 455/414.4

(58) Field of Classification Search .......... 709/220–221
See application file for complete search history.

(56) References Cited

U.S. PATENT DOCUMENTS

| | | | |
|---|---|---|---|
| 5,963,916 A | | 10/1999 | Kaplan |
| 5,983,176 A | * | 11/1999 | Hoffert et al. ............... 704/233 |
| 6,496,979 B1 | * | 12/2002 | Chen et al. .................. 717/178 |
| 6,665,533 B1 | * | 12/2003 | Sakoda .................... 455/414.2 |
| 6,959,436 B2 | | 10/2005 | Peng .......................... 719/310 |
| 7,043,205 B1 | * | 5/2006 | Caddes et al. .............. 455/41.2 |
| 7,065,783 B2 | * | 6/2006 | Rygaard ........................ 726/4 |
| 7,085,577 B1 | * | 8/2006 | Katsuno et al. .......... 455/456.3 |
| 7,150,025 B2 | * | 12/2006 | Gentry et al. ............... 719/327 |
| 7,190,949 B2 | * | 3/2007 | Tsuda et al. ................ 455/411 |
| 7,200,390 B1 | * | 4/2007 | Henager et al. ............. 455/419 |
| 7,200,590 B2 | * | 4/2007 | Everett-Church et al. ...... 707/3 |
| 7,209,950 B2 | * | 4/2007 | Bennett et al. .............. 709/206 |
| 7,272,407 B2 | * | 9/2007 | Strittmatter et al. ......... 455/500 |
| 7,275,243 B2 | * | 9/2007 | Gibbons et al. ............. 717/159 |
| 7,324,826 B2 | * | 1/2008 | Carey et al. ................. 455/466 |
| 7,366,460 B2 | * | 4/2008 | O'Farrell et al. ........... 455/3.06 |
| 7,379,731 B2 | * | 5/2008 | Natsuno et al. .......... 455/412.1 |
| 7,395,534 B2 | * | 7/2008 | Alcazar et al. .............. 717/174 |
| 2002/0078209 A1 | * | 6/2002 | Peng .......................... 709/227 |
| 2002/0103934 A1 | * | 8/2002 | Fishman et al. ............. 709/246 |
| 2002/0112014 A1 | * | 8/2002 | Bennett et al. .............. 709/206 |

(Continued)

OTHER PUBLICATIONS nReach Welcome page [retrieved on Feb. 4, 2004]; Retrieved from Internet: <URL:http://www.nreach.biz/indez.php.

(Continued)

*Primary Examiner*—John Follansbee
*Assistant Examiner*—Saket K Daftuar
(74) *Attorney, Agent, or Firm*—Fish & Richardson P.C.

(57) ABSTRACT

Methods and apparatus, including computer systems and program products, for transmitting mobile device data. A method includes querying a first mobile device for data residing on the first mobile device; wirelessly transmitting, to a computer system, a specification of the data residing on the first mobile device; determining suitability of data for a second mobile device; and receiving, at the second mobile device, a specification of data for the second mobile device that is based on the specification of the data residing on the first mobile device. Another method includes wirelessly receiving, at a computer system, a specification of data residing on the first mobile device; and wirelessly transmitting, to the second mobile device, a specification of data for the second mobile device that is based on the specification of the data residing on the first mobile device.

28 Claims, 10 Drawing Sheets

U.S. PATENT DOCUMENTS

| | | | |
|---|---|---|---|
| 2002/0166127 A1* | 11/2002 | Hamano et al. | 725/105 |
| 2003/0050837 A1* | 3/2003 | Kim | 705/14 |
| 2003/0233383 A1* | 12/2003 | Koskimies | 707/204 |
| 2004/0003398 A1* | 1/2004 | Donian et al. | 725/34 |
| 2004/0127205 A1* | 7/2004 | Mahajan | 455/418 |
| 2004/0176080 A1* | 9/2004 | Chakravorty et al. | 455/414.1 |
| 2004/0176118 A1* | 9/2004 | Strittmatter et al. | 455/500 |
| 2006/0173951 A1* | 8/2006 | Arteaga et al. | 709/203 |
| 2006/0253409 A1* | 11/2006 | Ronkainen et al. | 707/1 |

OTHER PUBLICATIONS nReach First Time User Instructions [retrieved on Feb. 4, 2004]; Retrieved from Internet: <URL:http://www.nreach.com/static/nreach/docs/firsttimeuser.html.

"nReach Expands National Distribution with First Self-Service MobileContent Vending Machine", nReach Press Release, Golden, CO, May 27, 2003.

* cited by examiner

TRANSMITTING MOBILE DEVICE DATA

CROSS-REFERENCE TO RELATED APPLICATION

This application claims the benefit of U.S. Provisional Patent Application Ser. No. 60/554,864, filed on Mar. 19, 2004, the contents of which are incorporated by reference.

BACKGROUND

The following description relates to installing an application on a mobile device such as a mobile phone or hand-held computer.

Mobile devices, such as mobile phones, are increasingly available with a wide variety of software and hardware features including personal digital assistants (PDAs), digital cameras, and the ability to run third-party computer software (e.g., applications and/or program data). For example, many phones are capable of downloading and playing ringtones provided by a third-party.

When a user of a mobile device desires to install an application or ringtone on the phone, the user typically must use the interface of the mobile device, which in the case of a mobile phone, is typically a combination of a twelve-button keypad and a small liquid crystal display (LCD), to navigate across multiple menus associated with one or more mobile device content providers in order to manually search for the application. Then, the user typically uses the mobile device interface to download and install the application.

After a using a mobile device for a substantial period of time, users often desire to replace the mobile device for any of a number of reasons. For example, a user may desire a newer model mobile device, or a user may wish to change service providers and a wireless service provider requires the use of a different model mobile device. In any case, a user may desire to have the applications and/or program data that were available on the original mobile device transferred to the replacement mobile device. However, a replacement mobile device may have a different runtime environment or version of the runtime environment, such that the applications that were available for the previous device are not necessarily compatible with the replacement device.

SUMMARY

Described here are methods and apparatus, including computer program products, that implement techniques for installing an application on a mobile device.

In one general aspect, the techniques feature a method of transmitting data to a mobile device. That method includes querying a first mobile device for data residing on the first mobile device; wirelessly transmitting, to a computer system, a specification of the data residing on the first mobile device; determining suitability of data for a second mobile device; and receiving, at the second mobile device, a specification of data for the second mobile device that is based on the specification of the data residing on the first mobile device.

Implementations may include one or more of the following features. The method may further include selectively mapping data, from the specification of the data residing on the first mobile device to the specification of the data for the second mobile device, based on the suitability of data for the second device. An application residing on the first mobile device may be suitable for the second mobile if the second mobile device is compatible with the runtime environment version of the application.

Selectively mapping data may include: if the specification of the data residing on the first mobile device includes an application and the application is suitable for the second mobile device, including information related to the application in the specification of the data for the second mobile device. Selectively mapping data may include: if an application residing on the first mobile device is not suitable for the second mobile device, performing a search for a suitable application for the second mobile device to return a search result, and if the search result includes a suitable application for the second mobile device, including information related to the suitable application in the specification of the data for the second mobile device. The information related to the suitable application may be a reference to the suitable application. The method may further include: if a suitable application is not found for the second mobile device, excluding information related to the application in the specification of the data for the second mobile device. The method may further include: if a suitable application is not found for the second mobile device, including a placeholder for a suitable application.

The specification of the data for the second mobile device may include a reference to data that is available for downloading. The specification of the data residing on the first mobile device may include program data. The specification of the data residing on the first mobile device may include an application.

The method may further include wirelessly transmitting, to the computer system, an identification of the second mobile device. The identification of the second mobile device may include a telephone number. The first mobile device may have the same identification as the second mobile device. The specification of the data for the second mobile device may include the data for the second mobile device. The first mobile device and the second mobile device may be mobile phones. The specification of the data for the second mobile device may include a reference to the data and the method further may include executing, on the second mobile device, an application for downloading the data, where the application is operative to cause the downloading of the data based on the reference.

In another aspect, a computer program product, tangibly embodied in an information carrier, includes instructions operative to query a first mobile device for data residing on the first mobile device; wirelessly transmit, to a computer system, a specification of data residing on the first mobile device; and receive, at a second mobile device, a specification of data for the second mobile device based on the specification of the data residing on the first mobile device.

Implementations may include one or more of the following features. The computer program product may further include instructions operative to selectively map data, from the specification of the data residing on the first mobile device to the specification of the data for the second mobile device, based on the suitability of data for the second device. The instructions operative to selectively map data may include instructions operative to, if an application residing on the first mobile device is not suitable for the second mobile device, perform a search for a suitable application for the second mobile device to return a search result, and if the search result includes a suitable application for the second mobile device, include information related to the suitable application in the specification of the data for the second mobile device.

The computer program product may further include instructions operative to, if a suitable application is not found for the second mobile device, including a placeholder for a suitable application. The specification of the data for the second mobile device may include a reference to data that is available for downloading. The first mobile device and the second mobile device may be mobile phones. The specification of the data for the second mobile device may include a reference to the data and the computer program product further may include instructions operative to execute, on the second mobile device, an application for downloading the data, where the application is operative to cause the downloading of the data based on the reference.

In another aspect, a system for installing an application on a mobile device includes a database that is accessible by a computer system; and the computer system independent of a mobile device, where the computer system operative to query a first mobile device for data residing on the first mobile device; receive, at the computer system, a specification of data residing on the first mobile device; determine suitability of the data residing on the first mobile device for a second mobile device; and wirelessly transmit, to the second mobile device, a specification of data for the second mobile device that is based on the specification of the data residing on the first mobile device.

Implementations may include one or more of the following features. The computer system may be further able to selectively map data, from the specification of the data residing on the first mobile device to the specification of the data for the second mobile device, based on the suitability of data for the second device. The computer system being able to selectively map data may include the computer system being able to, if an application residing on the first mobile device is not suitable for the second mobile device, perform a search for a suitable application for the second mobile device to return a search result; and if the search result includes a suitable application for the second mobile device, include information related to the suitable application in the specification of the data for the second mobile device.

The computer system may be further able to, if a suitable application is not found for the second mobile device, include a placeholder for a suitable application. The specification of the data for the second mobile device may include a reference to data that is available for downloading. The first mobile device and the second mobile device may be mobile phones. The specification of the data for the second mobile device may include a reference to the data and the computer system may be further able to execute, on the second mobile device, an application for downloading the data, where the application is operative to cause the downloading of the data based on the reference.

In another aspect, a method of transmitting data from a first mobile device to a second mobile device includes wirelessly receiving, at a computer system, a specification of data residing on the first mobile device; and wirelessly transmitting, to the second mobile device, a specification of data for the second mobile device that is based on the specification of the data residing on the first mobile device.

Implementations may include one or more of the following features. The first mobile device and the second mobile device may be mobile phones. The method may further include determining, at a first point in time, that the data is not available for downloading, and notifying, at a second point in time, the second mobile device that the data is available for downloading, in response to the data being available for downloading. The method may further include searching for data corresponding to the data residing on the first mobile device.

The method of searching for data may search any number of computer data offerings from any number of mobile content providers. The data residing on the first mobile device may include program data. The data residing on the first mobile device may include an application.

In another aspect, a computer program product, tangibly embodied in an information carrier, includes instructions operable to cause data processing apparatus to wirelessly receive, at a computer system, a specification of data residing on a first mobile device, and transmit, to a second mobile device, a specification of data for the second mobile device based on the specification of the data residing on the first mobile device.

Implementations may include one or more of the following features. The first mobile device and the second mobile device may be mobile phones.

The computer program product may further include instructions operable to search for data corresponding to the data residing on the first mobile device. The instructions operable to search for data may include instructions operable to search any number of computer data offerings from any number of mobile content providers.

In another aspect, a method of inventorying a mobile device includes a computer system independent of the mobile device querying the mobile device for applications residing on the mobile device, and wirelessly transmitting, to a computer system, a specification of one or more applications residing on the mobile device. the mobile device is a mobile phone.

Implementations may further include determining if the specification of the applications residing on the mobile device includes an application to be invoiced, and, if the mobile device includes the application to be invoiced, generating an invoice for that application.

The systems and techniques described here may provide one or more of the following advantages. A user of a mobile device may browse for, and cause software to be installed, on a mobile device using a user interface other than that of the mobile device. For example, the interface may be a touch-screen of a computer kiosk or a web-based application visible in a web browser running on a personal computer system. Such an interface may provide significant advantages (e.g. less cumbersome to navigate, increased screen size, higher quality display, different or additional features, faster communications ability, etc.) over the twelve-button keypad and small LCD screen typically associated with a mobile device. An application, known as the download application, running on a computer system independent of the mobile device may receive input from the user interfaces and may cause the data stores of multiple mobile device content providers to be searched for desired software. Thus, a user may have a larger variety of software to choose from and mobile device content providers may use a single portal as a point of sale. The download application may be employed in conjunction with a download-assistance tool that is resident on the mobile device such that software may be seamlessly installed on the mobile device without user input on the mobile device. The download application may be implemented such that software can be browsed for and installed regardless of the runtime environment with which the software is compatible. For example, the download application may allow a user to browse for Palm, Binary Runtime Environment for Wireless (BREW), Java, and Windows Mobile software and install any of that software on a mobile device, yet the download application need not be specially modified for each runtime environment.

A download-assistance tool may be provided for a mobile device. The download-assistance tool may be employed in conjunction with a search server. The search server may receive information identifying software to be searched for, and the search server may search mobile device content providers for the desired software. If the search server finds the desired software, the search server may advantageously work in conjunction with the download-assistance tool to seamlessly install the software on the mobile device without user input on the mobile device.

A transfer tool may be installed on a first mobile device and/or a second mobile device. The transfer tool may be pre-loaded on the mobile devices such that the mobile devices are sold with the transfer tool or the transfer tool may be later downloaded to the mobile devices. The transfer tool may transfer computer data residing on the first mobile device to the second mobile device. For example, if a user of a mobile phone desires to upgrade to a different mobile phone, the user may have the contents of the original phone mirrored to the replacement mobile phone so the user has the same or similar contents, such as phonebook entries and software applications. The transfer tool may inventory the computer data residing on the first mobile device before sending computer data to the second mobile device. Because the first and second mobile devices may have different runtime environments, the transfer tool may work in conjunction with a search server, which may advantageously search for the same or similar computer data, such that the second mobile device has the computer data mirrored from the first mobile device even though the instances of applications and/or program data residing on the first mobile device are not compatible with the second mobile device. Also, the search server may convert program data, such as phonebook entries, to a different format such that program data from the first mobile device may be compatible with applications on the second mobile device. Because the search server may store an inventory of computer data on a mobile device, if the mobile device is lost, the inventory on the search server can be used to mirror the contents of a lost mobile device onto a replacement mobile device.

In addition, the transfer tool may be adapted for "gifting" software. For example, if a user of a first mobile device wishes to gift a software application to a person who has a second mobile device, the first mobile device may be used to select an application on the first mobile device and cause the application to be transferred to the second mobile device as a gift.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference numbers and designations in the various drawings indicate like elements.

DETAILED DESCRIPTION

A Mobile Device Network

Figure 1:
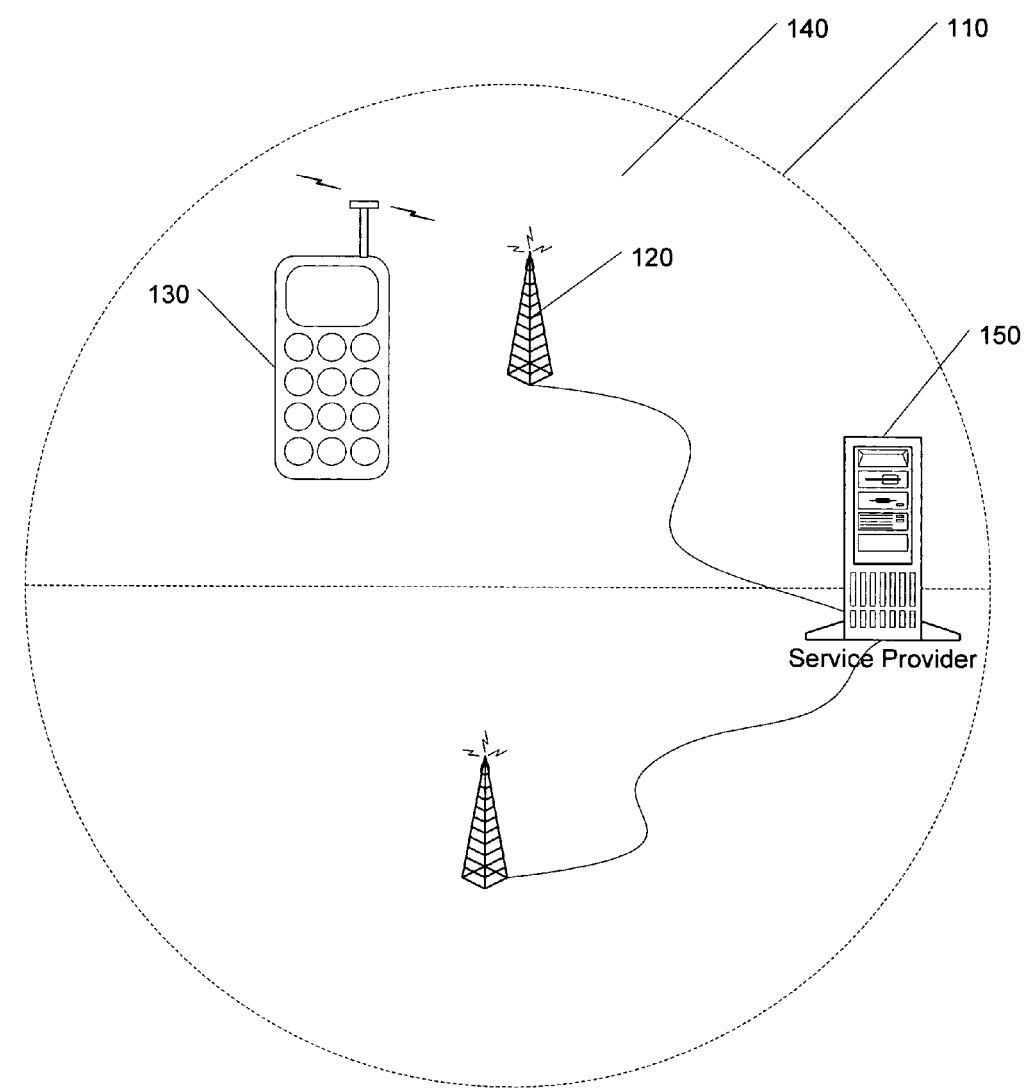
FIG. 1 is an illustration of a wireless network for a mobile device.

FIG. 1 is an illustration of a wireless network 110 for a mobile device, such as a mobile phone. The wireless network 110 includes multiple base stations, such as a base station 120, which are capable of receiving signals from mobile devices, such as a mobile phone 130, in the respective areas of coverage (e.g. the base station 120 is in a coverage area 140). Each base station is electrically linked to a mobile device switch 150, also known as a mobile telephone switching office, which governs the operation of the wireless network 110 and handles phone connections to a land-based phone system. Each mobile device switch may be operated by a single service provider and may include computer hardware for mobile device services. The wireless network 110 may be a cellular network, such as a Code-Division Multiple Access (CDMA), Global System for Mobile communication (GSM), or Universal Mobile Telecommunications Service (UMTS) network, or any other type of mobile device network. In alternative implementations mobile devices that are supported for communication on the network 110 need not be limited to a mobile phone and may include mobile devices such as PDAs, or mobile phones that integrate the functionality of other devices, such as digital cameras and PDAs.

Figure 2:
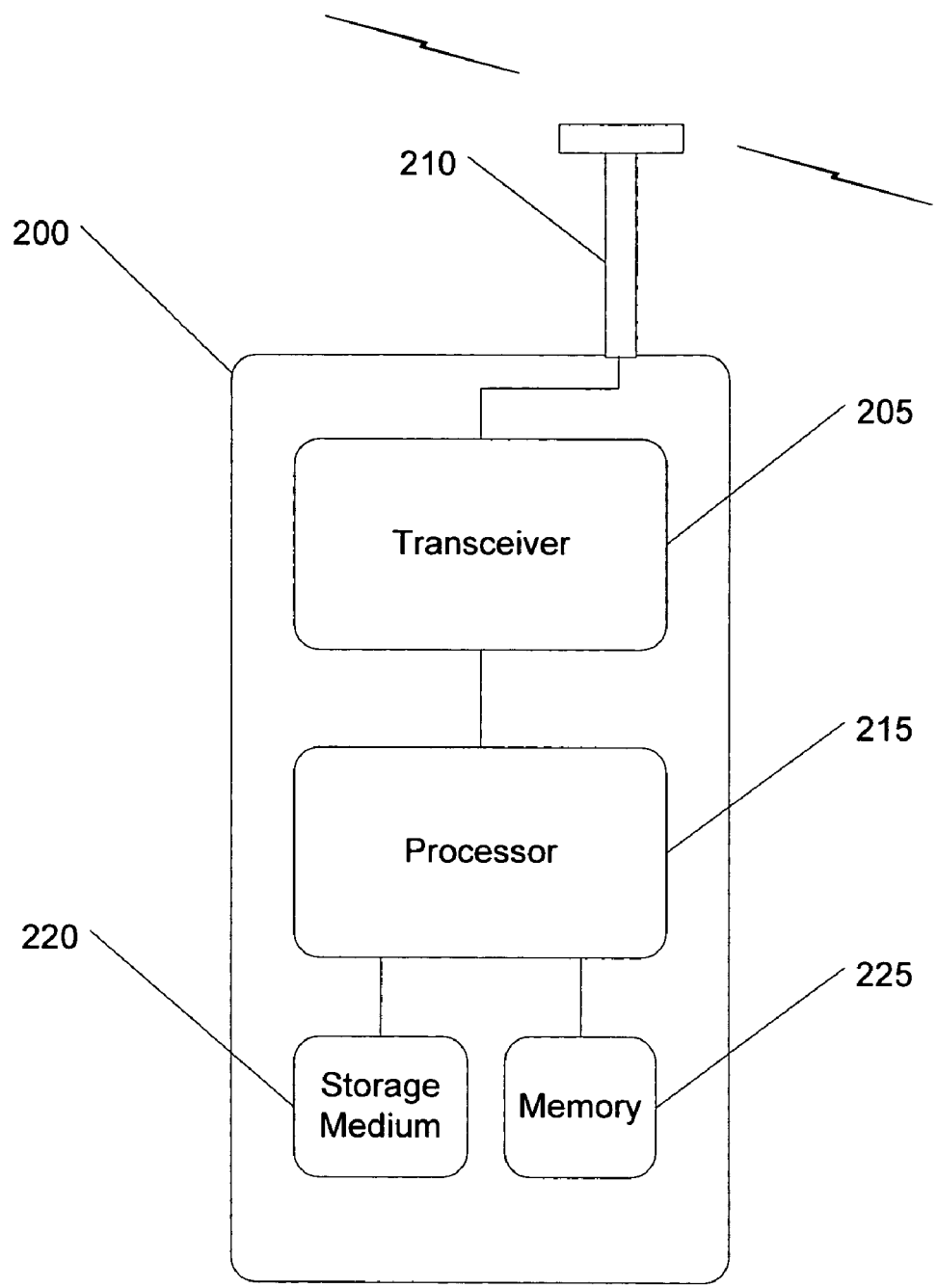
FIG. 2 is a block diagram of a mobile phone.

FIG. 2 is a block diagram of a mobile phone 200 that may be used in connection with the network of FIG. 1 and the described techniques. The mobile phone 200 includes a transceiver 205 connected to an antenna 210 for communicating voice and data to and from a remote server, wireline telephone connection, and/or another mobile device through a wireless communication system. The transceiver 205 is connected to a processor 215 that controls the operation of the mobile phone 200, including the operation of the transceiver 205. A storage medium 220, which may be removable, read-only, or read/write media and may be magnetic-based, optical-based, semiconductor-based media, or a combination of these, may store operating system software for the mobile phone 200. A memory 225 may store additional, potentially less vital information, such as applications and/or program data that may be loaded into the mobile phone 200. Both the memory 225 and the storage medium 220 are connected to the processor 215. The processor 215 may operate in accordance with software, applications, or other instructions stored in the memory 225 and/or the storage medium 220. In one possible implementation, the mobile phone 200 may be configured such that applications come pre-loaded on the mobile phone 200. Thus, instead of having to download applications, a user of a mobile phone may already have them available.

Applications for the mobile phone 200 may be written in Java code, C/C++ code, in accordance with a Binary Runtime Environment for Wireless (BREW) Software Development Kit (SDK), or some other appropriate format. The storage medium 220 in the mobile phone 200 may include a Java virtual machine. Alternatively or in addition, the storage medium 220 may include software for a runtime environment, such as BREW client software or a Java Virtual Machine. The BREW platform, which was developed by Qualcomm and is described in greater detail at "www.qualcomm.com/brew," enables Java and BREW applications to be downloaded onto and executed on the mobile phone 200. The storage medium 220 may include software for implementing Motorola's Integrated Digital Enhanced Network (iDEN)

technology. In general, a Java virtual machine may be run on top of the BREW client to support Java applications/applets and other types of extensions may be run on top of the BREW client to support other types of applications.

A System for Downloading Mobile Device Software

Figure 3:
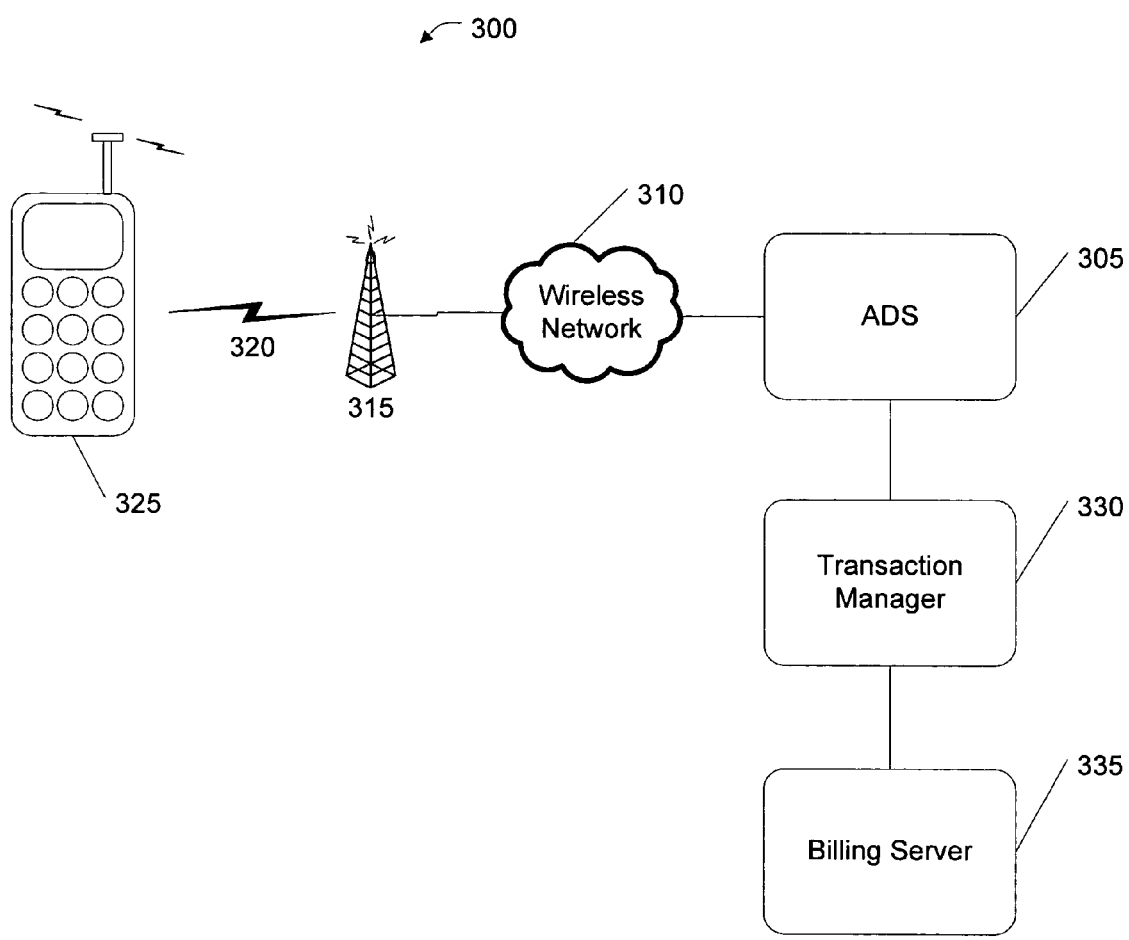
FIG. 3 is a block diagram of a wireless system including a BREW-enabled mobile device.

FIG. 3 is a block diagram of a system 300 for downloading mobile device software. Although FIG. 3 will be discussed in reference to BREW-compatible mobile devices and BREW-compatible software, the system need not be limited to BREW-enabled mobile devices or BREW-compatible software.

The system 300 includes a BREW-enabled mobile device. A BREW, Java, or other BREW-compatible application may be stored on an application download server (ADS) 305 and may be downloaded from the ADS 305, through a wireless network 310, and to a base station 315 in the vicinity of a mobile phone 325 for which the application is intended. The base station 315 in turn transmits the application over a wireless communication link 320 to the mobile phone 325. When an application is downloaded from the ADS 305, the ADS 305 collects application download event information and sends the information to a transaction manager 330. The transaction manager 330 combines the download event information with other information, such as application pricing structure and developer data for the downloaded application, to produce usage records. The transaction manager 330 sends the usage records to a billing server 335, which may perform billing services, such as generating invoices. In addition, the billing server 335 may allow an application developer, a carrier, and/or a third party associated with the ADS 305 to run a report and find out how many users are subscribing to a particular service offering or application on a real-time or near real-time (e.g. an up-to-the-minute) basis.

The ADS 305 may be associated with a particular wireless service provider or an entity other than a wireless service provider. In some implementations, a third party that offers the mobile services for a number of service providers may operate the ADS 305.

The ADS 305 may store applications, which may be developed by the operator of the ADS 305, by one or more service providers, and/or by third party developers. The ADS 305 may offer only pass-through access to certain carrier and/or third party applications, such that the applications are stored and managed on a server associated with the carrier or third party. In some implementations, most or all of the available applications may be stored and managed on the ADS 305. The operator of the ADS 305 may have agreements with the carriers or other third party developers to offer the applications and to provide for payment to the carriers or other third party developers.

The services offered on the ADS 305 may be based on agreements between the operator of the ADS 305 and the service providers for the ADS operator to act as a sales outlet for the services. The ADS operator may act as a mobile virtual network operator (MVNO), in which case the ADS operator essentially becomes a reseller of cellular airtime and other mobile services. Thus, the ADS operator purchases the minutes and resells them to the subscriber, and the contractual relationship is between the consumer and the ADS operator.

Downloading the Download-Assistance Tool

Figure 4:
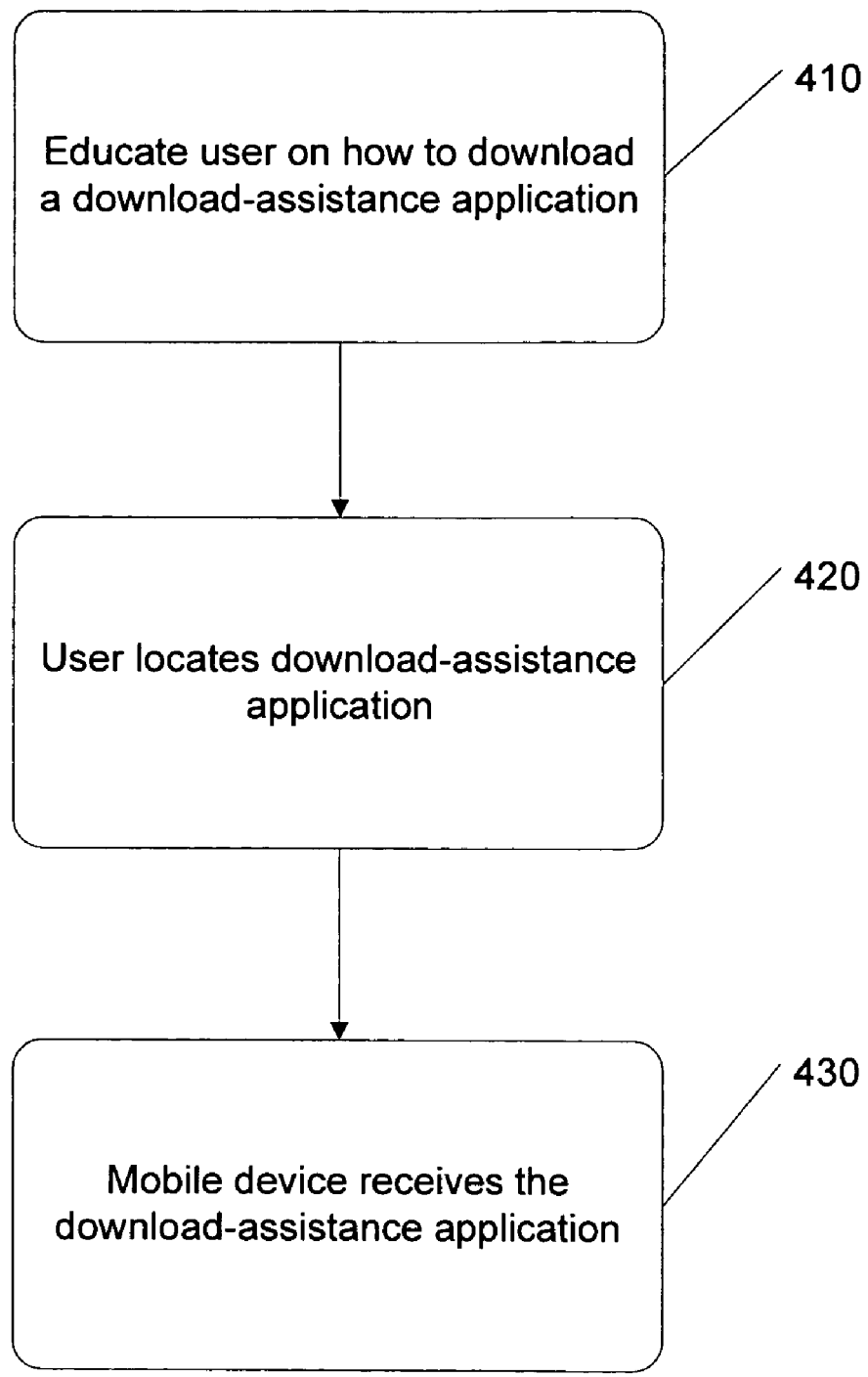
FIG. 4 is a flowchart of interactions that can result in the downloading of an application on a mobile device.

FIG. 4 is a flowchart of interactions that can result in the downloading of an application to a mobile device, such as a mobile phone. The interactions involve the use of a user interface, which may be any type of user interface, such as a web-browser interface of a personal computer system or a user interface on a computer kiosk. The user may interact using any type of input device, such as a keyboard, a mouse, buttons, a trackball, or a touch-screen. In FIG. 4, the application that is first downloaded to the user's mobile device is a download-assistance tool. A download-assistance tool is an application that can execute on a mobile device and assist the mobile device in downloading other applications (i.e., software). The download-assistance tool may be entitled "Search Tool." The technique illustrated in FIG. 4 can be used to download applications other than a download-assistance tool. In alternative implementations the download-assistance tool may be pre-loaded on a mobile device by, for example, a wireless service provider or mobile device retailer.

Figure 4A:
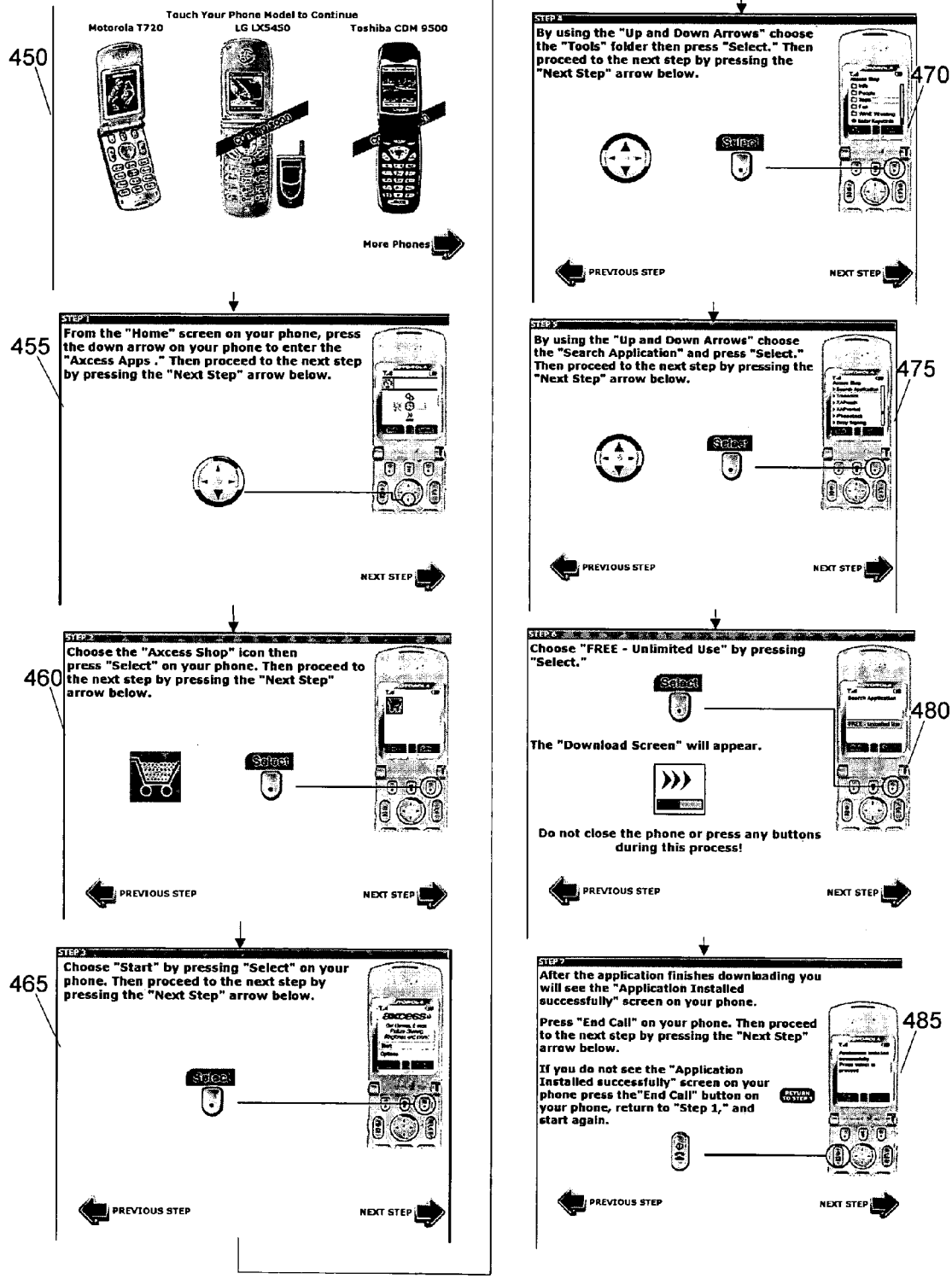
FIG. 4A is a series of illustrations of a process of educating a user.

At 410, a user may be educated on the procedure of downloading the download-assistance tool, such as illustrated in FIG. 4A. The education may involve the use of a graphical user interface instructing a user on how to proceed on their mobile device model in order to download the application. The instructions may include a combination of text and pictures directing a user to press certain buttons in a series of interactions. For example, 465 includes the text "choose start by pressing select" and includes a picture of a mobile phone with the select button circled. In FIG. 4A, a graphical user interface instructs a user at 450 to select their model of mobile device. Then, from 455 through 480 a user is prompted to navigate the mobile device through various applications already resident on their mobile device, such that the user locates and downloads the download-assistance tool. At 455 through 465, the user is instructed to initiate a mobile shop, called "Axcess Shop," that is pre-loaded on the mobile device. The mobile shop may differ depending on the mobile device model or the service provider. For example a unique mobile shop may exist for each wireless service provider. From 470 to 480, the user is instructed on how to use the mobile shop to download the download-assistance tool. Then, at 485, the user is educated on how to ensure the download-assistance tool was installed properly. In alternative implementations a user is not necessarily educated based on their mobile device model. For example, mobile devices may have similar interfaces based on their operating system software such that a user may receive instructions based on the operating system software of the mobile device.

At 420 the user locates the download-assistance tool via the mobile device. The user can locate the download-assistance tool based on the education provided at 410. The user may navigate the mobile device using a keypad, wheel, or other input device.

At 430 the mobile device wirelessly receives the download-assistance tool. The mobile device may receive the application via an application already resident on the mobile device, for example, ALLTEL's "Axcess Shop," which is used for manual searching and downloading of applications. Applications such as ALLTEL's "Axcess Shop" and Verizon's "Get it Now" are generally regarded as mobile shops because they allow a user of a mobile device to shop for software through their mobile phone.

The Download Center

Figure 5:
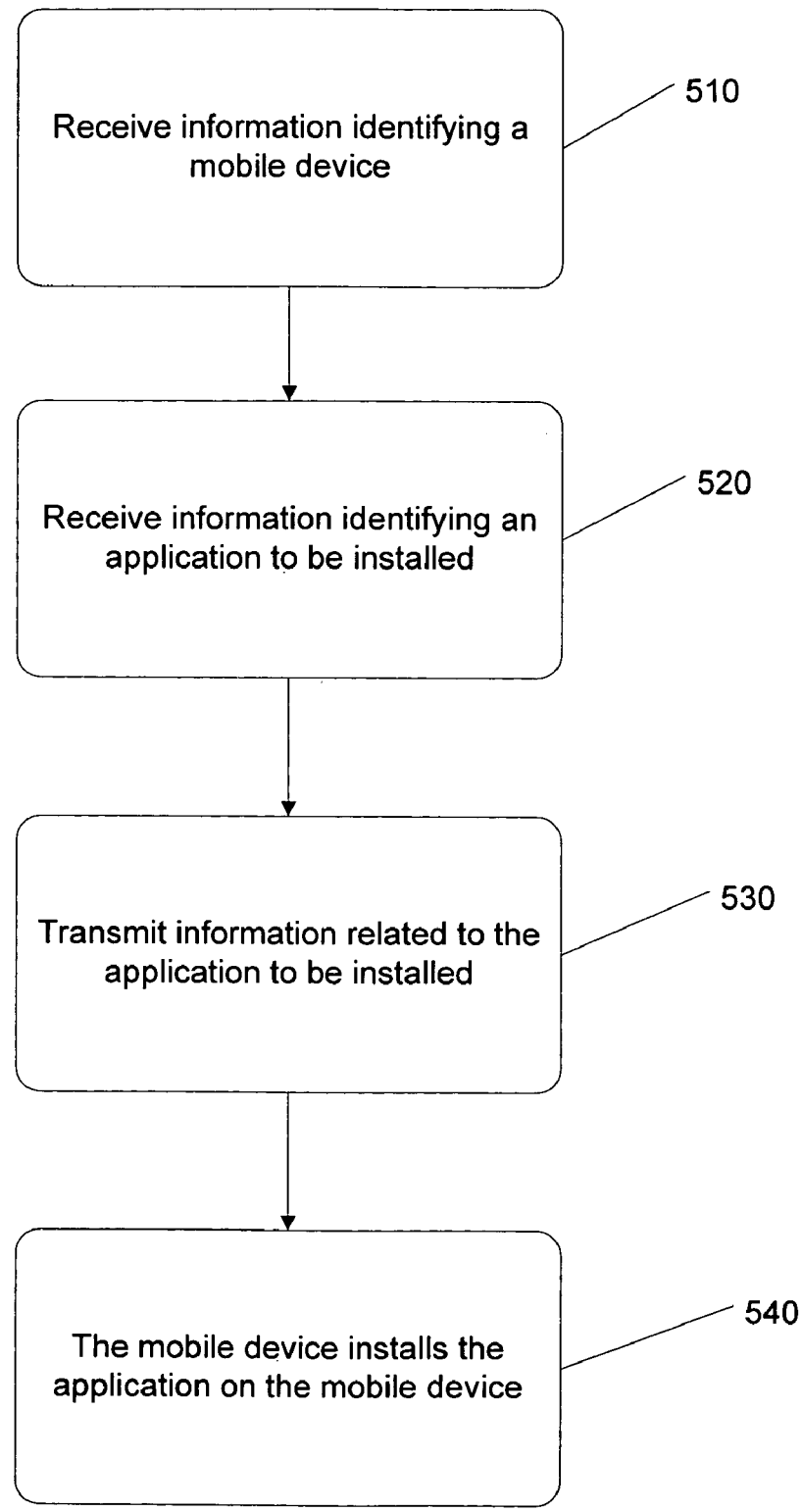
FIG. 5 is a flowchart of a method of downloading an application to a mobile device.

FIG. 5 is a flowchart of a method of installing an application on a mobile device. The method involves a user interacting with a user interface, such as a computer kiosk, to select software to install on a mobile device. Information related to a selection is forwarded to a computer system that causes the software to be installed on the mobile device. One or more processes of the method may be implemented as one or more applications residing on the mobile device and/or residing on the computer system that is operative to wirelessly communicate with the mobile device.

At 510, information identifying a mobile device is received via a user interface, such as a computer kiosk or a web browser. For example, a phone number may be entered on a computer kiosk. That information may be forwarded to a computer system that is connected to a wireless network, such as, for example, the ADS 305 of FIG. 3, which can use the information to identify the mobile device that will receive software. In alternative implementations, other information may be entered and may enable the mobile device to be identified.

At 520, information is received that identifies an application to be installed on the mobile device. That information may also be received by a user interface and forwarded to another computer system. As an example, a touch-screen computer kiosk may have a software catalogue, and a user may interact with the touch-screen to select an application that the user desires to install on his or her mobile device. In response to that selection, the computer kiosk may forward the selection to another computer system. The information identifying the application may include, for example, a title, a runtime version, or a name of a software publisher. In addition, the computer system may receive information related to payment for the application, including, for example, credit card information, account information for an account with a wireless service provider, or a confirmation that sufficient cash has been received to pay for the application.

At 530, information related to the application is wirelessly transmitted to the mobile device. The information may be transmitted by the computer system of 510 and/or 520. The information related to the application may be the same information that is used to identify an application. The information that is related to the application may be a reference (e.g. a pointer) to the application, which can be used to find, download, and/or install the application. For example, the information may be the name of a mobile device content provider and a location of the application at the mobile device content provider's mobile shop. That information can be used by a tool, such as the download-assistance tool discussed in reference to FIG. 4, which in turn uses a mobile shop to download and/or install the application. In the BREW environment, the information related to the application can be a search string. A search string can be a string of search criteria that can be used to uniquely identify an application through a search engine. For example, through available application programming interfaces (APIs), the download-assistance tool can use a search string in conjunction with a mobile shop's search function (e.g., Verizon's "Get it Now" search function) to identify a chosen application. The download-assistance tool can further use available APIs to cause the application to be downloaded and/or installed. Although, a particular method of downloading data through a BREW environment is discussed, other methods can be used.

The information related to the application may be transmitted in response to receiving the identification of the application, which was performed at 520. Instead of a reference to the application, the mobile device may, in alternative implementations, receive the desired application. Also, in alternative implementations the transmission to the mobile device may be in response to another stimulus. For example, a download-assistance tool on the mobile device may be notified by the computer system that an application is ready for downloading to the mobile device. In response to that notification, the download-assistance tool may cause the mobile device to query the computer system about applications that are ready for downloading. In response to that query, the computer system may transmit information related to the applications ready for downloading to the mobile device.

The user interface and computer system that transmits information to the mobile device may be configured such that software can be downloaded to the mobile device regardless of the runtime environment of the software. For example, a computer system may handle the downloading of BREW, Java, Windows Mobile, and Palm applications to a mobile device without requiring special modifications for each runtime environment corresponding to the mobile device. This might be possible, for example, if a reference to an application (e.g., a pointer or a search string) is sent to the mobile device because the reference may be suitable for reading on any runtime environment and the computer system may be configured to wirelessly communicate with any runtime environment version of a download-assistance tool (e.g. a protocol may be established which allows the computer system to communicate regardless of the runtime environment version of a download-assistance tool) to cause the downloading of applications to the mobile device.

A search may be performed by the computer system to find the desired application and a result of the search may be transmitted to the mobile device. For example, in response to receiving the information identifying the application, such as a title of a game, the computer system may search a list of software offerings, such as a list of games, from mobile device content providers. If the search is successful, the computer system may generate information related to the application, such as a reference to a mobile device content provider that offers that application, and may transmit that information to the mobile device.

At 540 the mobile device installs the application on the mobile device. Installing the application includes downloading the application and may further include registering the application as an application in the mobile device and providing a user access to the application. The application can be downloaded by a mobile shop in conjunction with a download-assistance tool using the information that was transmitted at 530. For example, the information related to the application, which was transmitted at 530, may be a reference to the location of the application, such as the name of a mobile device content provider and the title of the application. A download-assistance tool may cause a mobile shop to install the desired application on the mobile device based on the reference. The processes of 530 and 540 may be implemented such that, to install the desired application on the mobile device, a user need only use a single user interface. That might be advantageous because the user interface is an interface of a computer system (i.e., not the interface of a mobile device), which may be designed to be less cumbersome to navigate than the user interface of a mobile device.

Because the processes of FIG. 5 can be implemented in software residing on a computer system in conjunction with a download-assistance tool on the mobile device, the overall architecture can be viewed as a two-tiered software architecture, where the software runs on the computer system, receives information related to user input, and finds the desired application, and the download-assistance tool runs on the mobile device, communicates with the computer system that searches for the application, and installs the application on the mobile device.

Multiple computer systems may perform the processes of FIG. 5. For example, a computer kiosk may operate the user interface and receive the information identifying a mobile device and information identifying an application to be installed. That information may then be forwarded to a second computer system that can search software offerings from content providers and wirelessly transmit search results to mobile devices.

A Search Tool

Figure 6:
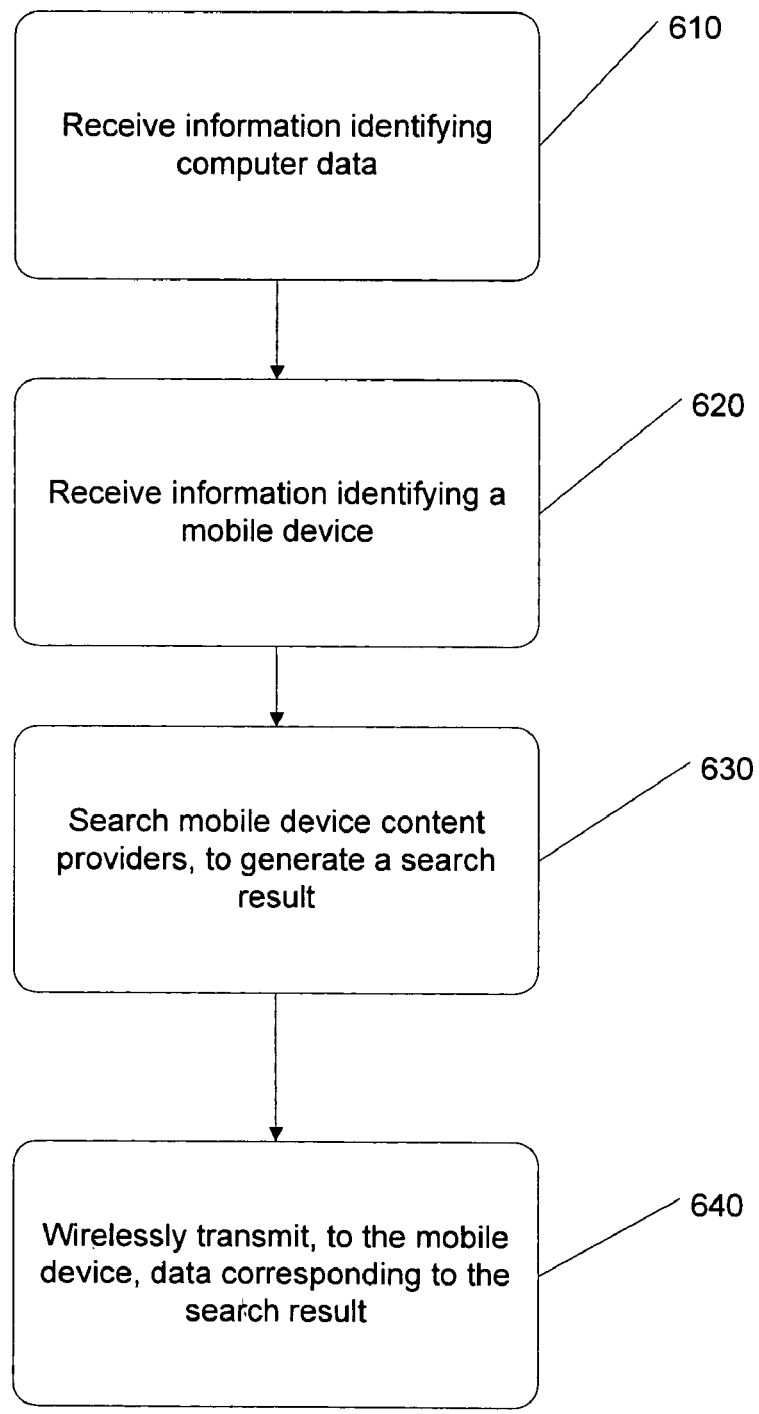
FIG. 6 is a flowchart of a method of accessing computer data.

FIG. 6 is a flowchart of a method of accessing computer data, such as application programs (e.g., data that is executable code) and program data (e.g., data that is not executable and may be interpreted by an application program). A program may be, for example, a software application such as a ringtone engine, and program data, might be, for example, a ringtone for the tune "Yankee Doodle." Other examples of program data include images, messages, and phonebook entries. Computer data is accessed in FIG. 6 when a user selects software via a user interface and in response to that selection a series of processes cause the software to be downloaded to a mobile device. For example, a user may use a web site to shop for a game and when the user "checks-out" after having selected the game, The processes of FIG. 6 may be implemented as processes performed jointly by an application residing on a mobile device and an application residing on a computer system other than the mobile device.

At 610 information is received that identifies computer data, such as an end-user application, a ringtone, or the like. The information is received by a computer system, called a search server. The search server may be, for example, a computer system operated by a wireless service provider and the computer system may be connected to a wireless network, such as the wireless network 110. The information can be received via a user interface, such as a computer kiosk or a web browser. The computer data may be applications, such as an application for scheduling appointments, or program data, such as a ringtone that is run on a ringtone application. For example, a user may browse a catalog of applications and ringtones at a touch-screen computer kiosk, and the user may select an application. The information that identifies that selection, such as the title of the application, would be received at the search server.

At 620, information identifying a mobile device is received via a user interface, such as a computer kiosk or a web browser. For example, a phone number may be entered on a computer kiosk. That information may be forwarded to a computer system that is connected to a wireless network, such as, for example, the ADS 305 of FIG. 3, which can use the information to identify the mobile device that will receive software. In alternative implementations, other information may be entered and may enable the mobile device to be identified.

At 630, mobile device content providers are searched based on the information that identified computer data at 610. For example, if an application was entitled "SchedulerApp," and that title was the information received at 610, the search server can search for all applications entitled "SchedulerApp." Searching is performed using any of a number of mechanisms and/or techniques. For example, the search may be performed on the search server such that the search server manages the searching of mobile device content providers to generate a search result. In that technique, the search server may send a query to each mobile device content provider and, in response to the queries, generate a search result. In alternative search techniques, queries need not be sent to each mobile device content provider in response to a user selection of computer data. For example, the search server may have lists of computer data offered by mobile device content providers and the search server may search through those lists to determine which content providers have the computer data that was identified at 610. In that scenario, the search server may routinely receive, or actively gather, lists of the computer data offered by the mobile device content providers.

In alternative implementations the search need not be limited to an exact match of the information identifying the computer data. As an example, the search server may receive a title, "SchedulerApp version 3," and the search server may search for applications with similar titles, such as "SchedulerApp version 4," which may be a newer version of the application. When searching for similar computer data, the search may be limited to suitable data. Data may be considered suitable based on a variety of factors, such as functionality and compatibility with the runtime environment of the mobile device. For example, a newer version of the computer data may be considered suitable if the data is compatible with the mobile device.

At 640 data corresponding to the search result is wirelessly transmitted to the mobile device. The mobile device is identified by the information received at 620. The search result may be, for example, an application, a reference to a location of an application, or a list of locations for finding an application. The data may be transmitted to a download-assistance tool residing on the mobile device, such as the download-assistance tool discussed earlier. That tool can use the data to install the application on the mobile device. All of the processes of FIG. 6 may be implemented such that a user need only, at a user interface other than the interface of the mobile device, specify computer data to download and the computer data is downloaded and/or installed on the mobile device without user input on the mobile device. As an example, a user may select an application at a computer kiosk and in response to that event the computer kiosk may forward a title of the application to the search server. Then, the search server may search for the application and send a reference to the application to the mobile device, which in turn downloads the application without any user interaction on the mobile device. In alternative implementations, the computer system may also receive a payment method.

Figure 7:
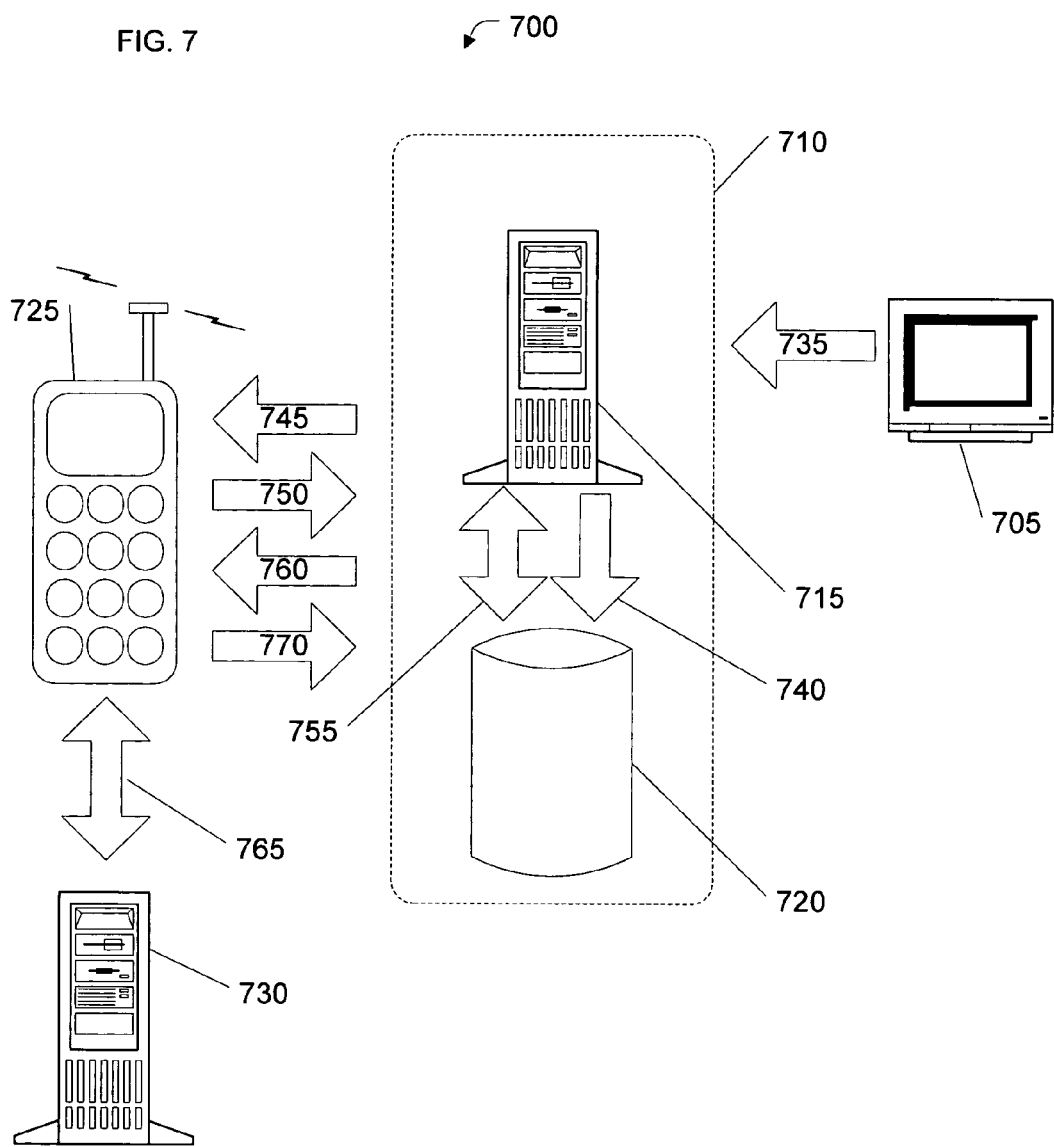
FIG. 7 is a diagram of a system for downloading computer data to a mobile device.

FIG. 7 is a block diagram of a system 700 for downloading computer data to a mobile device. The system 700 includes a user interface 705; a search server system 710, including a search server 715 and a database 720; a mobile device 725; and, a mobile device content provider 730. The arrows in FIG. 7 illustrate the flow of data between components in the system 700. The user interface 705 may be any type of user interface, including, for example, a display and an input device. A display may include a graphical user interface, a command-line interface, or a menu driven interface. A user may interact using any type of input device, such as a mouse, a keyboard, buttons, a trackball or a touch-screen.

The search server system 710 includes a search server 715 and a database 720. The search server 715 is a computer system that can wirelessly communicate with mobile devices via a wireless network. The database 720 is connected to the search server 715 and is operative to receive database commands, such as queries or requests to store information, from the search server 715. The database 720 can store, for example, information identifying a mobile device, such as a telephone number, and a list of computer data, such as applications, corresponding to the mobile device. The database may further indicate whether computer data has been downloaded to the mobile device. In alternative implementations, the database 720 may be part of the search server 715.

The mobile device 725 may be a mobile phone, a PDA, a pocket-sized personal computer (pocket PC), or a mobile phone that integrates the functionality of other devices, such as PDAs and digital cameras. The mobile device 725 is operative to wirelessly communicate with the search server 715. For example, the mobile device 725 may communicate via a wireless network, such as the wireless network 110. The wireless network may be a CDMA, GSM, UMTS, or any other type of mobile device network. The runtime environment of the mobile device 725 may be Java, BREW, or any other runtime environment.

The mobile device content provider 730 is operative to wirelessly communicate with the mobile device 725. For example, the mobile device content provider 730 may communicate via a wireless network, such as the wireless network 110. The mobile device content provider 730 stores computer data, including applications and program data. Applications are executable programs, for which a set of instructions on a computer system, such as the mobile device, control the processor of the computer system. Program data is data that may be generated by an application and is interpretable by an application. For example, a ringtone is program data because a ringtone is run by an application, such as a ringtone engine, in order to generate ringing sounds that correspond to the data that represents the ringtone. However, a ringtone may be an application if for example, the ringtone includes the software engine that generates the ringing sounds. A mobile shop, such as ALLTEL's "Axcess Shop," can access the mobile device content provider 730. A single mobile shop may be resident on the mobile device 725, or the mobile device 725 may have several mobile shops, each of which may correspond to a mobile device content provider.

The arrows in FIG. 7 depict a series of data flow interactions between components in the system 700 that may result in the download of computer data to the mobile device 725. For example, the interactions of FIG. 7 may result in the downloading of a game to a mobile phone. At 735, information identifying computer data, such as the title of an application, is transmitted from a user interface to the search server 715. For example, if a user browses a catalog of computer data at the user interface 705, selects an application entitled "GolfApp," and indicates that the application should be for a BREW-based phone, the title "GolfApp" and an indication that the BREW version of the application is desired may be transferred from the user interface 705 to the search server 715. Information identifying a mobile device may also be received at the search server 715. The information may include, for example, a phone number for a mobile phone, an email address of an email account that is used on a mobile device, or an account number of an account maintained by a wireless service provider. In the scenario that something other than a phone number, such as an account number, is used to identify a mobile device, that information may be matched to a corresponding phone number for a mobile phone. In alternative implementations the information identifying the application need not be specific to a runtime environment. For example, an application may be identified as "GolfApp" in a catalog of computer data on a user interface. The user may select "GolfApp" and the title may be enough information to identify the computer data. In alternative implementations, information for a method of payment, such as information identifying an account used for payment, credit card information, or a confirmation that a sufficient amount of cash was received, may be received by the search server 715.

At 740, the information received by the search server 715, such as inventories of mobile devices, may be stored in the database 720. The database may have records for each mobile device, which may be organized by a key field that uniquely identifies each mobile device, such as, for example, the mobile device phone number. In addition, the database 720 includes a list of the computer data corresponding to each mobile device, including computer data that is desired to be installed on a mobile device and/or computer data that is already installed on a mobile device. The database 720 need not include a list of all computer data residing on a mobile device. For example, the database may only store a list of end-user applications.

At 745 the search server 715 wirelessly notifies the mobile device 725 that data is available for download. The notification can be received by a download-assistance tool on the mobile device and the download-assistance tool may be woken up in response to the notification. In alternative implementations, the notification may indicate the data that is available for download such that the mobile device need not query the search server 715.

At 750, in response to the notification, the mobile device 725 queries the search server 715 to determine the information that is available for downloading. At 755 the search server searches the database for the computer data that is available for downloading. In addition, the search server may search one or more mobile device content providers to search for a mobile device content provider that has the computer data. Any techniques and/or mechanisms can be used to search mobile device content providers. For example, the search may be performed by sending a query to mobile device content providers, or a search may be made on a compilation of computer data, offered by mobile device content providers, that is available on the search server 715.

At 760 the search server 715 wirelessly transmits a reference to the application to the mobile device 725. The reference may be transmitted to a download-assistance tool. In alternative implementations, additional and/or different information, other than a reference, may be received by the mobile device 725. For example, the mobile device may receive the application.

At 765, a mobile device content provider 730 is contacted by the mobile device 725 for the application. A download-assistance tool, residing on the mobile device 725, may contact the mobile device content provider 730 using the information received at 760. The download-assistance tool may employ a mobile shop to download the computer data to the mobile device 725. For example, a download-assistance tool may receive a name of a mobile device content provider, such as "MobileContentMall," and the title of an application, such as "GolfApp." In response to receiving that information, the download-assistance tool may employ a mobile shop to contact MobileContentMall and download GolfApp.

At 770 the mobile device 725 sends, to the search server 715, a confirmation that the computer data has been successfully downloaded and installed. Data may be successfully downloaded and/or installed, for example, if all components of an application have been received and/or installed. A list of computer data that has been installed may be used, for example, to determine if an unsuccessfully installed application should be reinstalled. The list may also be used, for example, to track computer that is not yet available and should be installed on the mobile device 725.

If multiple articles of computer data were identified at 735, the technique of downloading computer data described in reference to FIG. 7 can continue until all the computer data has been installed. For example, if two applications were identified, interactions 745 through 770 may be completed for the first application and then interactions 745 through 770 may be completed for the second application. Alternatively, other techniques may be used to download multiple articles of computer data. For example, each article need not be identified and downloaded one-by-one. In one implementation, the search server 715 may receive a list identifying multiple articles of computer data and the search server 715 may send a list of references to those articles of computer data to the mobile device 725 at 760.

The interactions among components in the system 700 may be implemented such that a user need not interact with the mobile device 725. This is beneficial because a user need not fumble with the cumbersome twelve-button keypad and the small LCD typically associated with a mobile device, such as a mobile phone, in order to search for and download an application. Also, the techniques illustrated in FIG. 7 may be performed with more or fewer interactions among the components, and in varying order. For example the hand shaking between the mobile device 725 and the search server 715, such as 745 and 750, need not be performed in alternative implementations.

Transfer Tool

Figure 8:
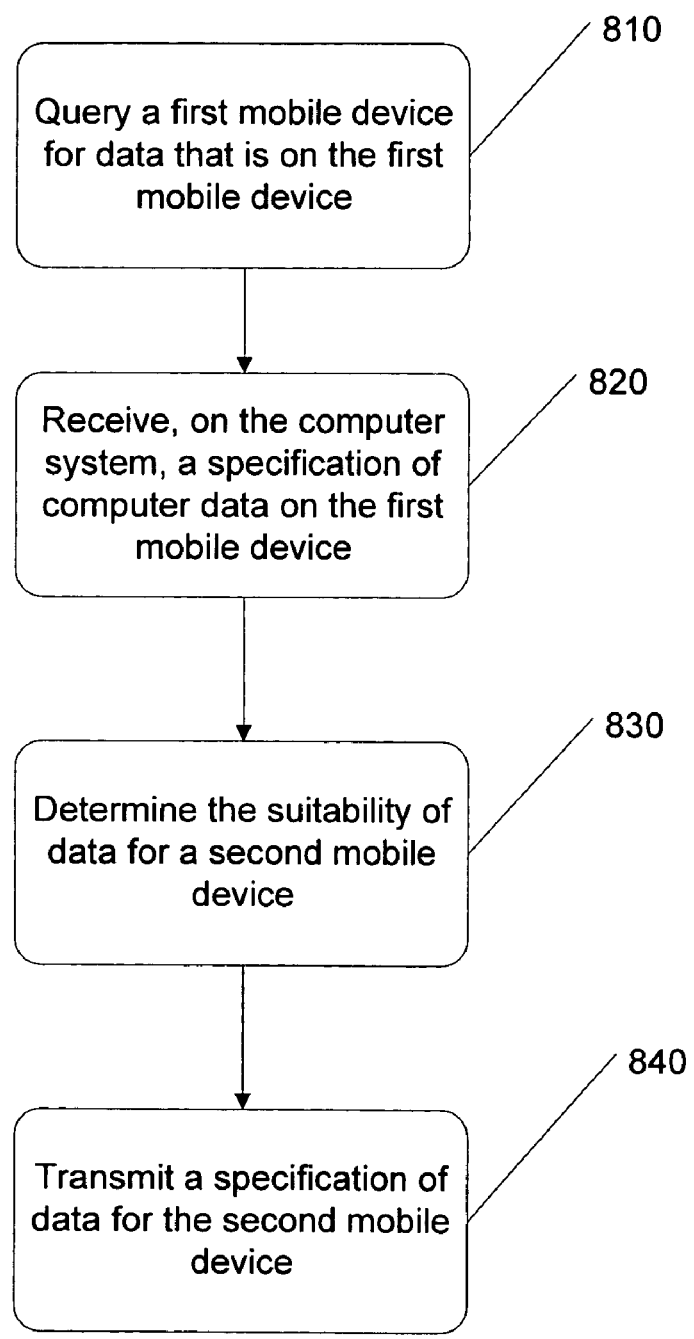
FIG. 8 is a flowchart of a method of transmitting data to a mobile device.

FIG. 8 is a flowchart of a method of transmitting data to a mobile device. Implementations of the method can be used to transfer applications from a first mobile phone to a second mobile phone (e.g., from a sending phone to a receiving phone). At 810 a sending device is queried for data residing on the sending device. The query is transmitted from a computer system, such as the search server described earlier. The sending device is a mobile device and may be, for example, a mobile phone or a PDA.

In response to the query, the sending device transmits a specification of data residing on the sending device (hereinafter "the first specification") to the computer system at 820. The specification is an inventory of computer data residing on the mobile device. For example, the specification may include a list of computer data residing on the sending device, such as applications, phonebook entries, and datebook entries. The specification may include a combination of the actual data or just a reference to the data. For example, the specification may include phonebook entries and a title of an application.

At 830 the computer system determines the suitability of the data, such as applications and/or program data, for the receiving device. This may include determining the compatibility of application programs for the runtime environment on the receiving device and/or the compatibility of program data for applications that will be mirrored to the receiving device. For example, if the runtime environments of the sending and receiving device are different, applications that are in the first specification might not be compatible with the receiving device. Also, for example, program data, such as phonebook entries, that are interpretable by the sending device might not be interpretable on the receiving device. If program data is not interpretable by the receiving device, the computer system may convert the program data to a suitable format.

At 840, a specification of data for the receiving device (hereinafter "the second specification") is wirelessly transmitted to the receiving device. The second specification is an inventory of computer data that should be mirrored to the receiving device and is based on the first specification. For example, the second specification may be a list of the titles of the applications that were on a sending device and a list of mobile device content providers corresponding to where the applications might be found. The second specification need not include the same computer data that was in the first specification, for example, if the sending and the receiving devices have two different runtime environments and if compatible versions of applications that were available for the sending device are not available for the receiving device. In that case, the computer system may determine what data, in the specification of the data residing on the sending device should be included in the specification of the data for the receiving device, and selectively map that data. In the case that computer data is not available for the receiving device, the second specification may include suitable data, a placeholder, or might not include any reference or data related to that computer data. Suitable data is an alternative and may be chosen based on a variety of factors, such as the functionality and the compatibility of the computer data. For example, if a datebook application entitled, "DateBook version 3," was available on the sending device, a suitable substitute may be a newer version of the application, such as a datebook application entitled "DateBook version 4," or another application with similar functionality, such as another datebook application. A placeholder takes the place of the computer data and may be temporary. A placeholder may be, for example, a reminder for the receiving device to routinely check for the availability of the computer data.

The second specification is wirelessly transmitted from the computer system and can be received by a download-assistance tool that resides on the receiving device. In response to receiving the second specification, the download-assistance tool can use the specification to download computer data, such as applications. For example, a first specification may include a title of an application, such as "Scheduling Application," and program data, such as appointments for the scheduling application. Based on that specification, the second specification may include a reference to from where the scheduling application may be downloaded and the program data for the appointments. A download-assistance tool residing on the receiving device may use the reference to download the scheduling application from a mobile device content provider.

The processes of FIG. 8 may be adapted for a gifting application. A gifting application allows a user of a sending device to send computer data to a receiving device as a "gift." The application may have aspects that are resident on the mobile devices and on another computer system. For example, a user of a sending device may cause a gifting application to wirelessly transmit a first specification of computer data, such as a title of an application, to the computer system. In order to identify a receiving device, the sending device may send identifying information, such as the phone number of the receiving device, to the computer system. The computer system may then search for the application and wirelessly transmit, to a gifting application on the receiving device, a reference to a mobile device content provider. The gifting application on the receiving device may then use a mobile shop to download the application from a mobile device content provider. In order to make the transfer of the application a gift, the sending device may send information related to a method of payment to the computer system.

Figure 9:
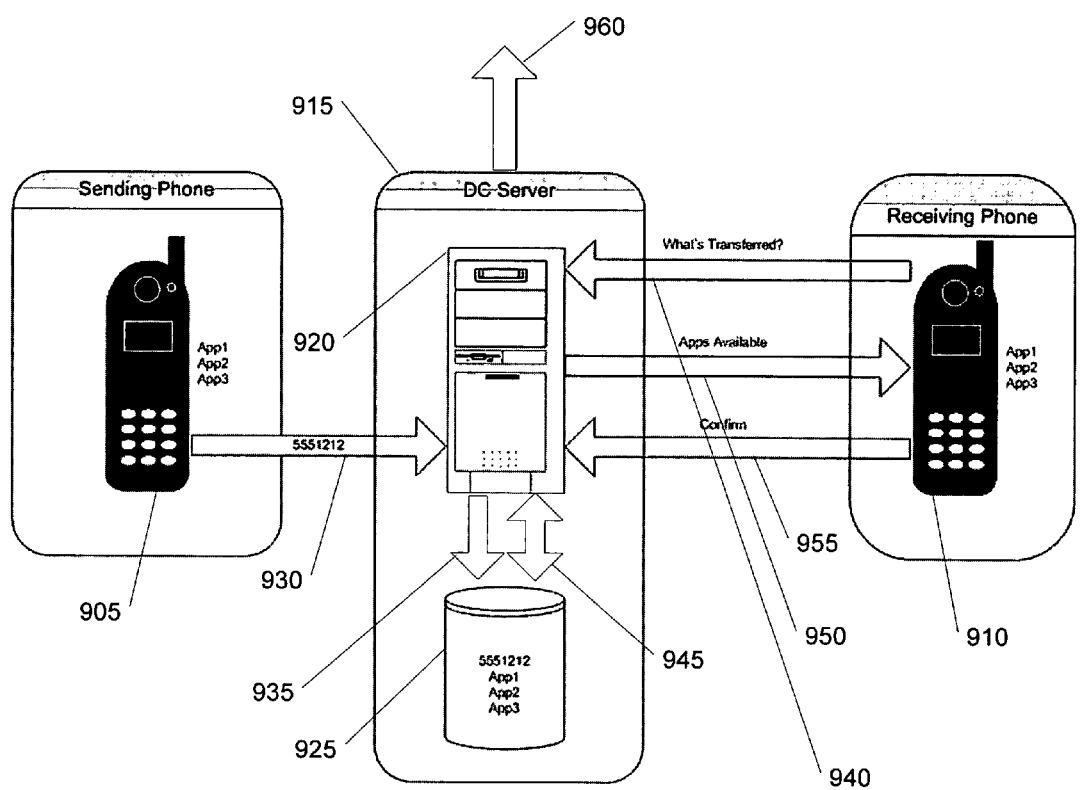
FIG. 9 is a dataflow diagram.

FIG. 9 is a dataflow diagram that illustrates transferring computer data from a sending mobile device (a sending phone 905) to a receiving mobile device (a receiving phone 910). Data is transferred from the sending phone 905 to the receiving phone 910 with the use of a search server system 915, which includes a search server 920 and a database 925. Although the mobile devices in FIG. 9 are mobile phones, the mobile devices may be any type of mobile device and the sending device may differ from the receiving device. For example, the receiving phone 910 can be made by a different manufacturer, be a different type of device (e.g. the sending device may be a PDA while the receiving device is a mobile phone), or have a different runtime environment (e.g. the sending device may have a BREW runtime environment while the receiving device has a Palm runtime environment). The search server 920 is a computer system that is operative to wirelessly communicate with the mobile devices. The database 925 is connected to the search server 920 and is operative to receive database commands. The database 925 can store inventories of computer data, such as computer data that resides on a mobile device. The database may correspond each inventory to a mobile device to which the computer data should be mirrored. For example, the database may store information identifying a mobile device, such as a telephone number, and a list of computer data, such as applications, that should be mirrored to that mobile device. The database may also store other information about computer data for a mobile device. For example, the database 925 may indicate whether an application has been successfully downloaded to a corresponding mobile device, or whether an application is available for downloading. In alternative implementations the database 925 may be part of the search server 920. Also, in alternative implementations the database may store additional and/or varying information. For example, the database 925 may associate an inventory with the mobile device from which the inventor was transmitted, instead of associating the inventory with a different mobile device. This may be advantageous, for example, if a mobile phone is lost and a replacement phone is to include computer data from the lost mobile phone because the original inventory of the mobile phone may be used to transfer data to a replacement phone that has same phone number.

An application on the sending phone 905, known as a transfer tool, inventories the data, including applications and program data residing on the sending phone 905. For example, the tool may generate a list of phonebook entries, appointments, and software that are resident on a mobile device.

At 930, the sending phone 905 wirelessly transmits a specification of the data residing on the sending phone to the search server 920. The specification of the data residing on the sending phone is an inventory of computer data and may be, for example, a list of applications and program data. The computer data listed in the specification of the data may be limited to that computer data which is not part of the runtime environment (e.g. the operating system and program data related to the operating system might not be part of the specification of the data residing on the sending phone). In alternative implementations the specification of the data residing on the sending phone may include data that is selectively chosen by a user. For example, the transfer tool may prompt a user to decide which applications should be mirrored to the receiving phone and a specification of the data residing on the sending phone may include a selection of computer data based on those user selections. In alternative implementations the transfer tool need not be initiated by user input on the sending phone. For example, a computer system may initiate the transfer tool on the sending phone.

In addition to the specification of the data, the sending phone 905 wirelessly transmits information identifying the receiving phone 910, such as the phone number of the receiving phone 910. The information identifying the receiving phone 910 is used to identify the transaction (i.e. that the specification of the data residing on the sending phone is to be mirrored to the receiving phone). In alternative implementations information identifying the receiving phone 910 need not be used to identify the transaction. For example, information identifying the sending phone 905 may be used and the receiving phone 910 may query for the information using the sending phone's number. In alternative implementations a phone number need not be used. For example, the sending phone 905 may be identified by an identifier that is randomly generated.

The receiving phone 910 may be identified by the information that is used to identify the sending phone 905. For example, the same phone number may be used for both the sending phone 905 and the receiving phone 910. In that example, the receiving phone 910 might be associated with the phone number when the sending phone 905 is not associated with the phone number and vice versa, such that data residing on the sending phone 905 is mirrored to the receiving phone 910. This may be advantageous, for example, if a user wishes to upgrade the sending phone 905 and wants to use the same phone number, or if a user loses the sending phone 905 and wants a replacement phone with the same phone number.

The specification of the data is stored on the database 925, at 935. The phone number of the receiving phone 910 is used as a key field in the database 925 of records that include the inventory of the sending phone 905; however, other techniques may be used to store the inventory.

At 940 the receiving phone 910 queries the search server 920 to see if any computer data is available for download. The receiving phone 910 can query the search server 920 in response to a user directing a transfer tool on the receiving phone 910 to check for computer data to be downloaded. In alternative implementations the receiving phone 910 may query the search server 920 in response to any type of event. For example, the search server 920 may initiate the transfer tool on the receiving phone 910 by notifying the search server 920 that computer data is available for download.

At 945 the search server 920 determines which computer data that should be mirrored to the receiving phone 910. Making the determination involves reviewing the specification of the data residing on the sending phone 905 that is stored in the database 925. This process may further involve determining the suitability of data for the receiving phone 910 and the availability of data for the receiving phone 910. Computer data is available if the data exists in the database 925 or if the data can be found on a mobile device content provider. A mobile device content provider may be searched if, for example, the receiving phone 910 has a different runtime environment than the sending phone 905 and the search server 920 determines that a version of an application that is listed on the specification of the data on the sending phone 905 is not compatible with the receiving phone 910. In that scenario, the search server 920 searches for a version of the application that is compatible with the receiving phone 910. In alternative implementations, the specification of the data for the receiving phone may be the same as the specification of the data residing on the sending phone. For example, the sending phone 905 and the receiving phone 910 may have the same runtime environment, thus the computer data residing on the sending phone 905 may be presumed to be available for the receiving phone 910. In alternative implementations the search server 920 may search for substitute computer data if the computer data is not available.

At 950 the search server 920 wirelessly transmits a specification of data for the receiving phone 910 to the receiving phone 910. The specification of the data for the receiving phone 910 is based on the determination of computer data that should be mirrored to the receiving phone 910. The specification may include a mix of computer data and references to computer data. For example, the specification may include program data and references to a mobile device content provider where applications can be found.

At 955 the user of the mobile device confirms that the data should be downloaded to the receiving phone 910. For example, the user may be confronted with a list of applications and program data and the user may be asked to confirm whether he or she wants to download the computer data to the receiving phone. The receiving phone 910 wirelessly transmits the confirmation to the search server 920. In alternative implementations the user may be allowed to selectively choose which applications and/or program data to download to the receiving phone. For example, user may be confronted with a list of applications and program data, where each item in the list has a corresponding checkbox that the user may check to selectively confirm the computer data that the user wishes to download and/or install on the receiving phone 910.

In response to the search server 920 receiving the confirmation to download the computer data to the receiving phone, the search server 920 starts an application that causes the downloading of the computer data. The application may be the application that ran on the search server that was described in connection with FIG. 7. In alternative implementations the program data may be downloaded to the receiving phone separately from the applications. For example, the program data may be wirelessly transmitted from the search server 920 to the receiving phone 910 in response to the confirmation at 955 and the applications may be downloaded via the search tool at 960. In alternative implementations the program data may be downloaded as part of the specification of the data for the receiving phone and the confirmation need only be used for the downloading of applications. For example, the specification of computer data for the receiving phone may be a mix of references and program data. In that scenario the download-assistance tool may download and/or install the program data and the mobile shop may be employed to download applications using the references.

The mobile devices and the search server 920 may perform the processes described in reference to FIG. 9 such that user intervention is minimized. For example, the confirmation at 955 may be performed by the receiving phone 910 without user input. This is beneficial because a user might be relieved from having to interact with the cumbersome twelve-button keypad and the small LCD typically associated with a mobile device in order to mirror applications from the sending phone 905 to the receiving phone 910. Also, the techniques illustrated in FIG. 9 may be performed with more or fewer interactions and in varying order. For example, the hand shaking between the receiving phone 910 and the search server 920 (such as 940, 950 and 955), need not be performed if the search server 920 simply send the specification of the data for the receiving phone 910 to the receiving phone 910. In alternative implementations the search server may convert program data to a format that is suitable for the receiving phone 910. For example, if program data, such as phonebook entries are generated by the runtime environment of the sending phone 905 but are not compatible with the runtime environment of the receiving phone 910, the search server 920 may convert the phonebook entries to a different format for the receiving phone 910. Also, in alternative implementations, the download-assistance tool need not be employed to mirror the contents of the sending phone 905 onto the receiving phone 910.

Although the methods are shown in FIGS. 4-6 and 8 as being composed of a certain number of processes, additional and/or different processes can be used instead. Similarly, the processes need not be performed in the order depicted. Thus, although a few implementations have been described in detail above, other modifications are possible. Other implementations may be within the scope of the following claims.

The invention claimed is:

1. A method of transmitting data to a mobile device, the method comprising:
   at a computer system, querying a first mobile device for data residing on the first mobile device;
   at the computer system, receiving from the first mobile device a specification of the data residing on the first mobile device and information identifying a second mobile device, wherein the specification of the data residing on the first mobile device comprises a list of applications residing on the first mobile device;
   based on the specification received from the first mobile device, determining suitability of the data residing on the first device for the second mobile device comprising selectively identifying one or more of the applications residing on the first mobile device compatible with the second mobile device;
   transmitting to the second mobile device, a specification of data for the second mobile device that is based on the specification of the data residing on the first mobile device, wherein the specification of data for the second device comprises a list of the selectively identified one or more of the applications residing on the first mobile device compatible with the second mobile device; and
   selectively mapping data, from the specification of the data residing on the first mobile device to the specification of the data for the second mobile device, based on the suitability of data for the second device, wherein determining the suitability of the data residing on the first device for the second mobile device comprises determining whether the second mobile device is compatible with the runtime environment version of the application residing on the first mobile device.

2. The method of claim 1, wherein selectively mapping data comprises:
   including information related to the identified one or more of the applications in the specification of the data for the second mobile device.

3. The method of claim 1, wherein selectively mapping data comprises:
   if an application residing on the first mobile device is not suitable for the second mobile device:
   at the computer system performing a search for a suitable application for the second mobile device to return a search result; and
   if the search result includes a suitable application for the second mobile device, including information related to the suitable application in the specification of the data for the second mobile device.

4. The method of claim 3, wherein the information related to the suitable application comprises a reference to the suitable application.

5. The method of claim 2, further comprising:
   if a suitable application is not found for the second mobile device, excluding information related to the application in the specification of the data for the second mobile device.

6. The method of claim 3, further comprising:
   if a suitable application is not found for the second mobile device, including a placeholder in the specification of the data for the second mobile device for a suitable application.

7. The method of claim 1, wherein the specification of the data for the second mobile device comprises a reference to data that is available for downloading to the second mobile device.

8. The method of claim 1, wherein the specification of the data residing on the first mobile device comprises a list of program data.

9. The method of claim 1, wherein the information identifying the second mobile device comprises a telephone number associated with the second mobile device.

10. The method of claim 1, wherein the first mobile device has the same identification as the second mobile device.

11. The method of claim 1, wherein the specification of the data for the second mobile device includes the selectively identified one or more data for the second mobile device.

12. The method of claim 1, wherein the first mobile device and the second mobile device are mobile phones.

13. The method of claim 1, wherein the specification of the data for the second mobile device comprises a reference to the identified one or more of the applications residing on the first mobile device compatible with the second mobile device and the method further comprises:

executing, on the second mobile device, an application for downloading the identified one or more of the applications residing on the first mobile device compatible with the second mobile device, wherein the application for downloading is operative to cause the downloading of the identified one or more of the applications residing on the first mobile device compatible with the second mobile device based on the reference.

14. A non-transitory computer program product, tangibly embodied in non-transitory computer readable medium, the computer program product comprising instructions operative to cause data processing apparatus to perform operations comprising:

at a computer system, query a first mobile device for data residing on the first mobile device;

at a computer system, receive from the first mobile device a specification of data residing on the first mobile device and information identifying a second mobile device, wherein the specification of the data residing on the first mobile device comprises a list of applications residing on the first mobile device;

based on the specification received from the first mobile device, determine suitability of the data residing on the first device for the second mobile device comprising selectively identify one or more of the applications residing on the first mobile device available to be transmitted to the second mobile device;

transmit to the second mobile device, a specification of data for the second mobile device based on the specification of the data residing on the first mobile device, wherein the specification of data for the second device comprises a list of the selectively identified one or more of the applications residing on the first mobile device; and selectively mapping data, from the specification of the data residing on the first mobile device to the specification of the data for the second mobile device, based on the suitability of data for the second device, wherein determining the suitability of the data residing on the first device for the second mobile device comprises determining whether the second mobile device is compatible with the runtime environment version of the application residing on the first mobile device.

15. The non-transitory computer program product of claim 14 wherein the instructions operative to cause data processing apparatus to selectively map data comprises instructions operative to:

if an application residing on the first mobile device is not suitable for the second mobile device:

perform a search for a suitable application for the second mobile device to return a search result; and if the search result includes a suitable application for the second mobile device, include information related to the suitable application in the specification of the data for the second mobile device.

16. The non-transitory computer program product of claim 15 further comprising instructions operative to cause data process apparatus to perform operation comprising:

if a suitable application is not found for the second mobile device, including a placeholder in the specification of data for the second mobile device for a suitable application.

17. The non-transitory computer program product of claim 14, wherein the specification of the data for the second mobile device comprises a reference to data that is available for downloading to the second mobile device.

18. The non-transitory computer program product of claim 14, wherein the first mobile device and the second mobile device are mobile phones.

19. The non-transitory computer program product of claim 14, wherein the specification of the data for the second mobile device comprises a reference to the data and the computer program product further comprises instructions operative to cause data processing apparatus to:

execute, on the second mobile device, an application for downloading the identified one or more of the applications residing on the first mobile device compatible with the second mobile device, wherein the application for downloading is operative to cause the downloading of the identified one or more of the applications residing on the first mobile device compatible with the second mobile device based on the reference.

20. A system for installing an application on a mobile device, the system comprising:

memory for storing a database that is accessible by a computer system; and the computer system independent of a mobile device, the computer system operative to:

query a first mobile device for data residing on the first mobile device;

receive from the first mobile device, at the computer system, a specification of the data residing on the first mobile device and information identifying a second mobile device, wherein the specification of the data residing on the first mobile device comprises a list of applications residing on the first mobile device;

based on the specification received from the first mobile device, determine suitability of the data residing on the first mobile device for the second mobile device comprising selectively identifying one or more of the applications residing on the first mobile device available to be transmitted to the second mobile device;

wirelessly transmit, to the second mobile device, a specification of data for the second mobile device that is based on the specification of the data residing on the first mobile device; and selectively mapping data, from the specification of the data residing on the first mobile device to the specification of the data for the second mobile device, based on the suitability of data for the second device, wherein determining the suitability of the data residing on the first device for the second mobile device comprises determining whether the second mobile device is compatible with the runtime environment version of the application residing on the first mobile device.

21. The system of claim 20, wherein the computer system operative to selectively map data comprises the computer system being operative to:

if an application residing on the first mobile device is not suitable for the second mobile device:

perform a search for a suitable application for the second mobile device to return a search result; and if the search result includes a suitable application for the second mobile device, include information related to the suitable application in the specification of the data for the second mobile device.

22. The system of claim 21, wherein the computer system is further operative to:

if a suitable application is not found for the second mobile device, include a placeholder in the specification of the data for the second mobile device for a suitable application.

23. The system of claim 20, wherein the specification of the data for the second mobile device comprises a reference to data that is available for downloading to the second mobile device.

24. The system of claim 20, wherein the first mobile device and the second mobile device are mobile phones.

25. The system of claim 20, wherein the specification of the data for the second mobile device comprises a reference to the data and the computer system is further operative to:

execute, on the second mobile device, an application for downloading identified one or more of the applications residing on the first mobile device compatible with the second mobile device, wherein the application for downloading is operative to cause the downloading of the identified one or more of the applications residing on the first mobile device compatible with the second mobile device based on the reference.

26. The system of claim 20, wherein the computer system is operative to receive from the first mobile device a list of content providers at which the selectively identified one or more of the applications residing on the first mobile device compatible with the second mobile device are available.

27. The non-transitory computer program product of claim 14, further comprising instructions operative to cause data processing apparatus to receive from the first mobile device a list of content providers at which the selectively identified one or more of the applications residing on the first mobile device compatible with the second mobile device are available.

28. The method of claim 1, further comprising:

at the computer system, receiving from the first mobile device a list of content providers at which the selectively identified one or more of the applications residing on the first mobile device compatible with the second mobile device are available.

\* \* \* \* \*